O. W. DOOLITTLE.
LUBRICATOR.
APPLICATION FILED JUNE 9, 1916.
1,221,795.
Patented Apr. 3, 1917.
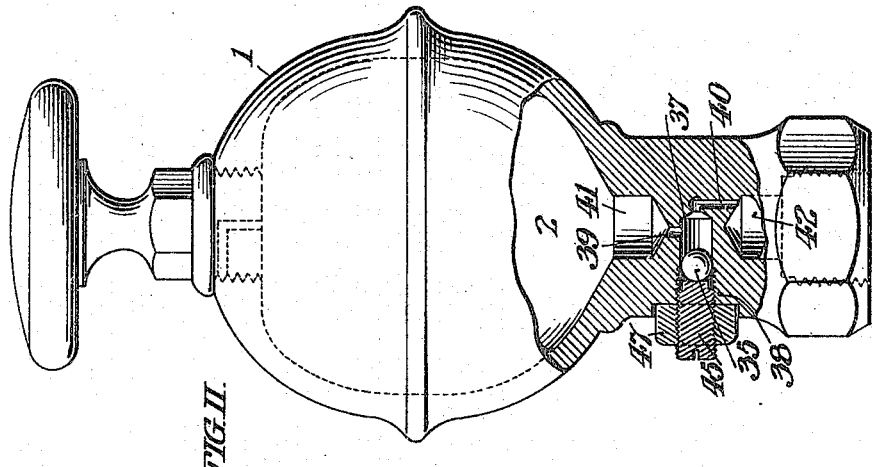
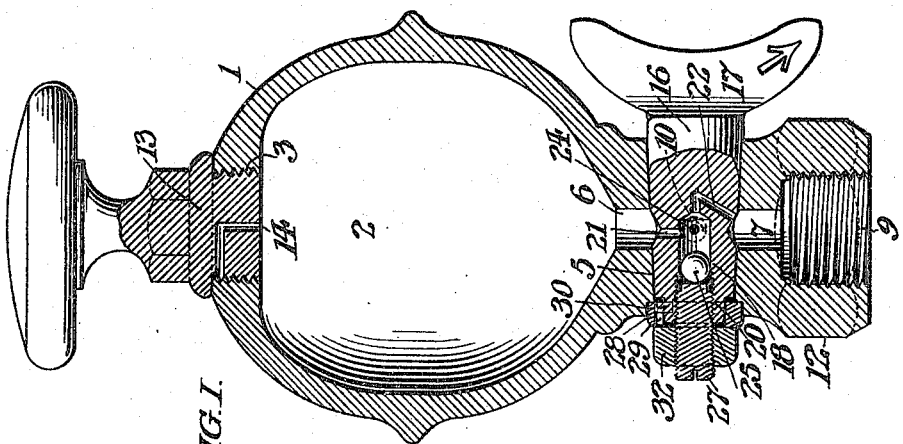
WITNESSES:
INVENTOR:
Orson W. Doolittle

UNITED STATES PATENT OFFICE.

ORSON W. DOOLITTLE, OF GLENSIDE, PENNSYLVANIA.

LUBRICATOR.

1,221,795.

Specification of Letters Patent.

Patented Apr. 3, 1917.

Application filed June 9, 1916. Serial No. 102,782.

*To all whom it may concern:*

Be it known that I, ORSON W. DOOLITTLE, a citizen of the United States, residing at Glenside, in the county of Montgomery and State of Pennsylvania, have invented a certain new and useful Improvement in Lubricators, whereof the following is a specification, reference being had to the accompanying drawing.

My invention is particularly designed to use dry graphite, but is adapted for other lubricants, and is of the type including in the lubricant passageway a body adapted to be reciprocated by fluctuations in fluid pressure upon respectively opposite sides thereof. Ordinarily, in devices of that type, such bodies are restricted to move vertically with respect to the lubricant outlet port, so as to seal the latter by resting thereover under normal conditions. However, I find that in attempting to use such devices with dry graphite in systems of steam piping, condensate from the steam or water vapor tends to collect in the chamber in which the body is mounted for reciprocation and to obstruct the lubricant discharge outlet to such a degree as to render the device inoperative or, at least, materially limit its efficiency. Therefore, it is an object of my invention to provide a lubricator wherein the movable body is adapted to reciprocate horizontally, and is not permitted to rest upon the lubricant discharge port, and any condensate is thus permitted to be discharged from the chamber in which said body is mounted.

My invention includes the various novel features of construction and arrangement hereinafter more definitely specified.

In the drawing: Figure I is a fragmentary vertical sectional view of a lubricator embodying my invention, wherein the mobile body, hereinafter termed the plunger, is mounted for reciprocation in a rotary plug valve whereby the operation of the lubricator is controlled.

Fig. II is a fragmentary vertical sectional view of a modified form of my invention wherein the plunger is directly mounted in the casing containing the supply of lubricant.

Referring to the form of my invention shown in Fig. I; the casing 1 is formed of a single casting, including the chamber 2 for lubricant, having the screw threaded lubricant inlet 3 at the upper end thereof, the conical valve chamber 5 below said chamber 2, the vertical passageway 6 between said chambers 2 and 5, and the vertical passageway 7 from said valve chamber 5, terminating in the screw threaded outlet 9, at the bottom of said casing, and the lateral vent 10 from said valve chamber through the wall of said casing which is removed in Fig. I.

Said casing is conveniently provided with the hexagonal wrench hold 12 at the lower end thereof, whereby it may be conveniently attached and removed, and has the removable closure 13 whereby said inlet 3 is manually sealed; said closure having the duct 14 through which communication may be established with the atmosphere without entirely unscrewing said closure. The conical valve plug 16 is rotary on a horizontal axis in said valve chamber 5 and has the handle 17 at its larger end, whereby it may be turned. The cylindrical plunger chamber 18 extends in coaxial position in said plug, terminating in the screw threaded socket 20 at the other end thereof. The two ports 21 and 22 are axially spaced in said plunger chamber 18, extending transversely to the plug axis and leading respectively to said passageways 6 and 7. The vent port 24 is axially spaced between said ports 21 and 22 in said plug, extending transversely to the plug axis and adapted to register with said casing vent 10.

The spherical plunger 25, in said plunger chamber 18, is adapted to be horizontally reciprocated by fluctuations in fluid pressure between said passageways 6 and 7. The screw 27, in said socket 20, forms an adjustable abutment for said plunger 25, limiting the extent of reciprocation of the latter with respect to said ports. The washer 28 encircling the socket end of said plug 16 is movable axially thereon but has the notch 29 engaging the stud 30 forming means connecting said plug and washer to turn together. The single nut 32 engages said screw 27 and bears upon said washer 28, so as to jam said screw in adjusted position in said plug and hold the latter in adjusted position in said casing.

The form of my invention shown in Fig. II differs from that shown in Fig. I in that the plunger 35 is directly mounted in the casing 36 in the plunger chamber 37 which terminates in the screw threaded socket 38. The two ports 39 and 40 are axially spaced in said plunger chamber 37 extending transversely to its axis and leading respectively to the passageways 41 and 42, which are similar to the passageways 6 and 7 above described. The plunger 35 in said plunger chamber 37 is adapted to be horizontally reciprocated by fluctuations in fluid pressure between said passageways 41 and 42. The screw 45 in said socket 38 forms an adjustable abutment for said plunger 35 limiting the extent of reciprocation of the latter with respect to said ports, and said screw is jammed in adjusted position by the nut 47 which bears directly upon said casing.

Although I prefer to employ a plunger which is spherical, it is to be understood that plungers of other forms may be used; for instance, cylindrical plungers of the same diameter as the spherical plungers above described may be substituted for them.

I do not desire to limit myself to the precise details of construction herein set forth as it is obvious that various modifications may be made therein without departing from the essential features of my invention as defined in the appended claims.

I claim:—

1. In a lubricator, a casing formed of a single casting, including a chamber for lubricant, having a screw threaded inlet at the upper end thereof, a conical valve chamber, below said first chamber, a vertical passageway between said two chambers, a vertical passageway from said valve chamber, terminating in a screw threaded outlet at the bottom of said casing, and a lateral vent from said valve chamber through the wall of said casing; a conical plug valve, rotary on a horizontal axis in said valve chamber, having a handle at one end, a cylindrical plunger chamber in coaxial position in said plug, terminating in a screw threaded socket at the other end of said plug, and two ports axially spaced in said plunger chamber, extending transversely to the plug axis and leading respectively to said passageways, and a vent port, axially spaced between said other ports in said plug, extending transversely to said axis and adapted to register with said casing vent; a spherical plunger in said plunger chamber, adapted to be horizontally reciprocated by fluctuations in fluid pressure between said passageways; a screw in said socket, forming an adjustable abutment for said plunger, limiting the extent of reciprocation of the latter with respect to said ports; a washer encircling the socket end of said plug and movable axially thereon; means connecting said plug and washer to turn together; and a single nut engaging said screw and bearing upon said washer; whereby said nut jams said screw in adjusted position in said plug and holds the latter in adjusted position in said casing.

2. In a lubricator, a casing formed of a single casting, including a chamber for lubricant, having an inlet at the upper end thereof, a conical valve chamber, below said first chamber, a vertical passageway between said two chambers, a vertical passageway from said valve chamber, terminating in a screw threaded outlet at the bottom of said casing, and a lateral vent from said valve chamber through the wall of said casing; a removable closure for said inlet; a conical plug valve, rotary on a horizontal axis in said valve chamber, a plunger chamber in coaxial position in said plug, terminating in a screw threaded socket at one end of said plug, and two ports axially spaced in said plunger chamber, extending transversely to the plug axis and adapted to respectively register with said passageways, and a vent port extending transversely to said axis and adapted to register with said casing vent; a plunger in said plunger chamber, adapted to be horizontally reciprocated by fluctuations in fluid pressure between said passageways; a screw in said socket, forming an adjustable abutment for said plunger, limiting the extent of reciprocation of the latter with respect to said ports; a washer encircling the socket end of said plug and movable axially thereon; means connecting said plug and washer to turn together; and a single nut engaging said screw and bearing upon said washer; whereby said nut jams said screw in adjusted position in said plug and holds the latter in adjusted position in said casing.

3. In a lubricator, a casing formed of a single casting, including a chamber for lubricant, having an inlet at the upper end thereof, a conical valve chamber, below said first chamber, a vertical passageway between said two chambers, a vertical passageway from said valve chamber, terminating in a screw threaded outlet at the bottom of said casing; a removable closure for said inlet; a conical plug valve, rotary on a horizontal axis in said valve chamber, a plunger chamber in coaxial position in said plug, terminating in a screw threaded socket at one end of said plug, and two ports axially spaced in said plunger chamber, extending transversely to the plug axis and adapted to respectively register with said passageways; a plunger in said plunger chamber, adapted to be horizontally reciprocated by fluctuations in fluid pressure between said passageways; and an adjustable abutment for said plunger, limiting the extent of reciprocation of the latter with respect to said ports.

4. In a lubricator, a casing including a chamber for lubricant, having an inlet, a valve chamber, below said first chamber, a passageway from said valve chamber, terminating in an outlet from said casing; a plug valve, rotary on a horizontal axis in said valve chamber, a plunger chamber in said plug, terminating in a screw threaded socket at the other end of said plug, and two ports axially spaced in said plunger chamber, extending transversely to the plug axis and adapted to respectively register with said passageways; and a plunger in said plunger chamber, adapted to be horizontally reciprocated by fluctuations in fluid pressure between said passageways.

5. A valve casing including a conical valve chamber and passageway leading to and from it; a conical plug valve in said chamber having a plunger chamber terminating in an axial screw socket at one end of said plug, ports, axially spaced in said chamber, adapted to respectively register with said passageways; a plunger in said plunger chamber, adapted to be reciprocated by fluctuations in fluid pressure between said passageways; a screw in said socket, forming an adjustable abutment for said plunger, limiting the extent of reciprocation of the latter with respect to said ports; a washer encircling the socket end of said plug and movable axially thereon; means connecting said plug and washer to turn together; and a single nut engaging said screw and bearing upon said washer; whereby said nut jams said screw in adjusted position in said plug and holds the latter in adjusted position in said casing.

In testimony whereof, I have hereunto signed my name at Philadelphia, Pennsylvania, this third day of June, 1916.

ORSON W. DOOLITTLE.

Witnesses:
ARTHUR E. PAIGE,
ANNA ISRAELVITZ.